United States Patent
Shi et al.

(10) Patent No.: US 11,103,865 B2
(45) Date of Patent: Aug. 31, 2021

(54) FIXED BED COUNTER-CURRENT REGENERATION DEVICE OF ION EXCHANGE RESIN AND APPLICATION METHOD OF FIXED BED COUNTER-CURRENT REGENERATION DEVICE

(71) Applicants: Nanjing University, Nanjing (CN); Nanjing University & Yancheng Academy Of Environmental Protection Technology And Engineering, Yancheng (CN)

(72) Inventors: Peng Shi, Nanjing (CN); Xun Cao, Yancheng (CN); Xinchun Ding, Yancheng (CN); Aimin Li, Nanjing (CN); Jianjun Dai, Yancheng (CN); Xiao Zhang, Yancheng (CN); Xiang Peng, Yancheng (CN); Dongmei Li, Yancheng (CN); Yinsen Li, Yancheng (CN); Jiali Tang, Yancheng (CN)

(73) Assignees: NANJING NORMAL UNIVERSITY, Nanjing (CN); Nanjing University & Yancheng Academy Of Environmental Protection Technology And Engineering, Yancheng (CN)

( * ) Notice: Subject to any disclaimer, the term of this patent is extended or adjusted under 35 U.S.C. 154(b) by 785 days.

(21) Appl. No.: 15/774,966

(22) PCT Filed: Jun. 28, 2017

(86) PCT No.: PCT/CN2017/090445
§ 371 (c)(1),
(2) Date: May 9, 2018

(87) PCT Pub. No.: WO2018/171068
PCT Pub. Date: Sep. 27, 2018

(65) Prior Publication Data
US 2021/0162397 A1 Jun. 3, 2021

(30) Foreign Application Priority Data

Mar. 23, 2017 (CN) .......................... 201710177921.9

(51) Int. Cl.
*B01J 49/09* (2017.01)
*B01J 49/90* (2017.01)
(Continued)

(52) U.S. Cl.
CPC ............... *B01J 49/09* (2017.01); *B01J 49/60* (2017.01); *B01J 49/90* (2017.01); *C02F 1/38* (2013.01); *C02F 1/42* (2013.01); *C02F 2303/16* (2013.01)

(58) Field of Classification Search
None
See application file for complete search history.

(56) References Cited

FOREIGN PATENT DOCUMENTS

| CN | 2362838 Y | 9/2000 |
|---|---|---|
| CN | 102489347 A | 6/2012 |

(Continued)

*Primary Examiner* — Chester T Barry
(74) *Attorney, Agent, or Firm* — Zhihua Han; Wen IP LLC

(57) ABSTRACT

The invention discloses a fixed bed counter-current regeneration device for ion exchange resin and the method of use, relates to the field of ion exchange resin regeneration. The device comprises a cyclone separator, a regeneration reactor, a fully mixed resin reactor, a desorption solution storage tank, and a regenerant storage tank, wherein the cyclone separator is placed on top of the regeneration reactor, the upper part of the cyclone separator is connected to the fully mixed resin reactor. A resin inlet is provided at the bottom of the cyclone separator, a resin bed and a resin filter are arranged inside the regeneration reactor, a resin outlet and a regenerant inlet are arranged at the bottom of the regeneration reactor, the resin outlet is connected to the fully mixed resin reactor, the regenerant inlet is connected to the des- (Continued)

orption solution storage tank and the regenerant storage tank, respectively, one side of the regeneration reactor is further provided with a regenerant outlet, and the regenerant outlet is connected to the desorption solution storage tank. The invention effectively improves resin regeneration efficiency via separator and counter-current, reduces the desorption solution yield, prevents mechanical wear and tear of the resin, and can be used as part of large-scale ion exchange resin applications.

10 Claims, 1 Drawing Sheet

(51) Int. Cl.
*C02F 1/42* (2006.01)
*C02F 1/38* (2006.01)
*B01J 49/60* (2017.01)

(56) References Cited

FOREIGN PATENT DOCUMENTS

| | | | |
|---|---|---|---|
| CN | 104003478 | A | 8/2014 |
| CN | 106881159 | A | 6/2017 |
| EP | 0004792 | A | 10/1979 |
| EP | 2321229 | B1 | 7/2013 |

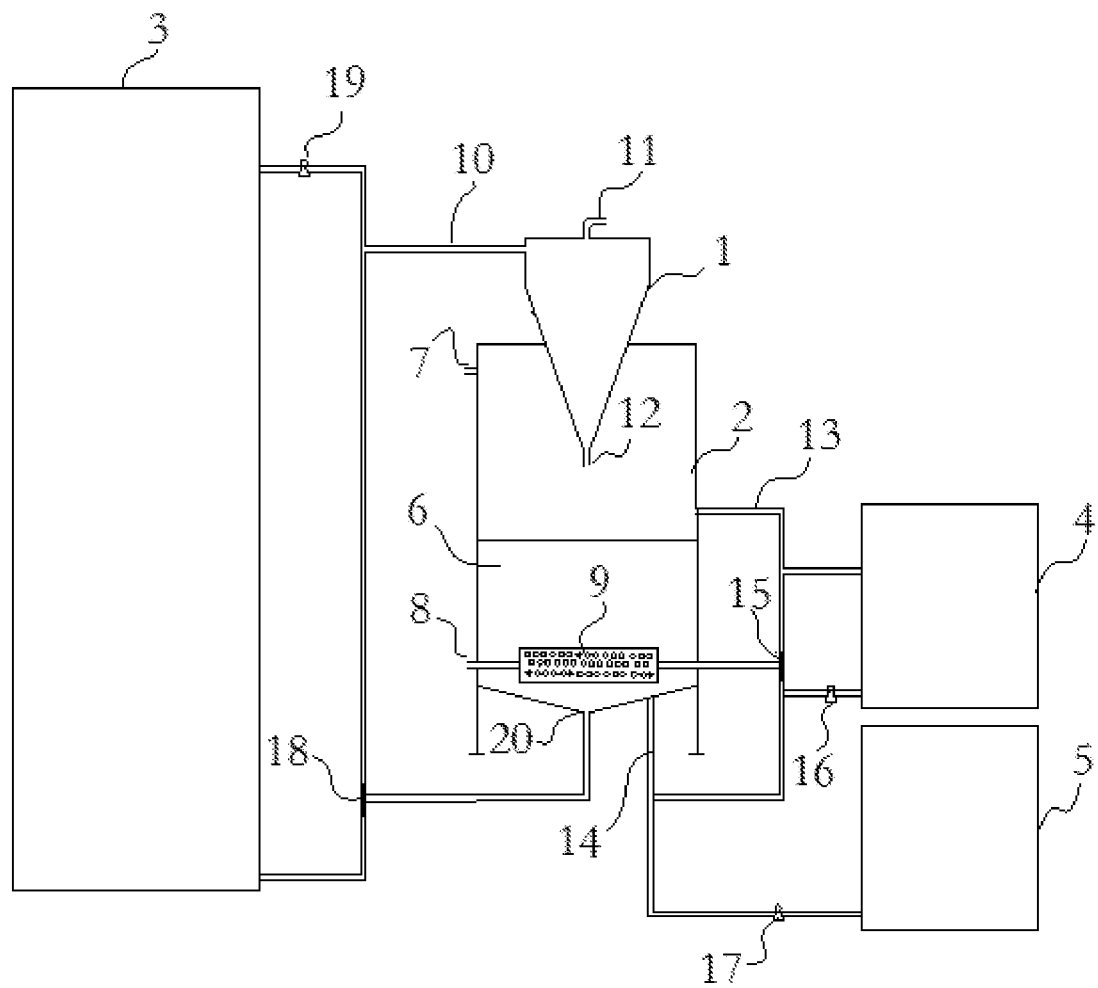

FIXED BED COUNTER-CURRENT REGENERATION DEVICE OF ION EXCHANGE RESIN AND APPLICATION METHOD OF FIXED BED COUNTER-CURRENT REGENERATION DEVICE

CROSS REFERENCE TO RELATED APPLICATION

This application is a national stage application of International application number PCT/CN2017/090445, filed Jun. 28, 2017, titled "Fixed Bed Counter-current Regeneration Device Of Ion Exchange Resin And Application Method Of Fixed Bed Counter-current Regeneration Device," which claims the priority benefit of Chinese Patent Application No. 2017101779219, filed on Mar. 23, 2017, which is hereby incorporated by reference in its entirety.

TECHNICAL FIELD

The invention relates to the field of ion exchange resin regeneration and, in particular, to an ion exchange resin fixed bed counter-current regeneration device and the method of use thereof.

BACKGROUND

With the continuous progression of industrialization and urbanization, the problem of water resource shortage has become increasingly prominent. The prevention and control of water pollution became a top priority in environmental management.

Ion exchange technology has a wide range of application in drinking water depth treatment and used water reclamation. Ion exchange resin is effective in removing organic material from water, as well as some toxic inorganic ions such as nitrate, sulfate, and bromide ions. At the same time, ion exchange resin can effectively reduce water detoxification byproduct and biological toxicity.

After an ion exchange resin reaches adsorption saturation, it needs desorption regeneration. Currently an often-used regeneration method is to transport the saturated resin to a regeneration system, to drain the water, and to mix the resin with regenerant according to a certain ratio, and to complete the regeneration by mechanical stirring. The existing resin regeneration methods have the following disadvantages: the existing regeneration method directly pumps the resin and water to the regeneration reactor, the concentration of the resin is generally less than 20%, more than 80% of the water body needs to be drained, the resin is drained for a long time and the regeneration efficiency is low; mechanical stirring is prone to break the resin and reduce the life span of the resin, and the stirring process will form a dead space where the contact between the resin and the regenerant are insufficient, reducing desorption efficiency; regenerant is used one single time, resulting in excessive desorption solution, increasing desorption solution disposal difficulty, and leading to higher operating costs.

A Chinese patent application was found. The application number is 2011104268701, the application date is Dec. 19, 2011, and the title of the invention is "a powder resin desorption and regeneration reactor." The application discloses a powder resin desorption and regeneration reactor that comprises a reactor, a resin separator, a desorption solution storage tank and a regenerated resin delivery system. One end of the resin separator is connected to a desorption solution discharge pipe, the other end of the desorption solution discharge pipe is connected to a desorption solution storage tank circulation pipe water injector inlet. The desorption solution storage tank circulation pipe water injector is installed on top of the desorption solution storage tank circulation pipe, the upper outlet of the desorption solution storage tank circulation pipe is connected with the desorption solution storage tank, and the lower outlet of the desorption solution storage tank circulation pipe is connected with the desorption solution storage tank via the desorption solution storage tank circulation pump; the regenerated resin delivery system includes a fully mixed resin reactor, a fully mixed resin reactor circulation pipe, a fully mixed resin reactor circulation pipe water injector, and a fully mixed resin reactor circulation pump. This application enables the continuous separation and regeneration of the resin, but an agitator is still used inside the reactor to blend, which adversely affect the service longevity and desorption efficiency of the resin.

Another Chinese patent application is found, with application number 2014107002313 and the filing date Nov. 28, 2014, entitled "flexible full-chamber fixed bed counter-current regeneration ion exchanger." The application discloses a flexible full-chamber fixed bed counter-current regeneration ion exchanger. Both ends of the exchanger tank are respectively provided with a running water inlet pipe and a running water outlet pipe, an ion exchange resin layer is provided in the middle of the tank body, a volume compensation layer is arranged in the tank body near the end of the running water inlet pipe, the volume compensation layer also includes a few densely arrayed volume compensators inside the tank body. By adopting a fixed bed, this application avoids the fragmentation impact of mechanical stirring on regenerated resin. Along with using a volume compensator to maintain a stable ion concentration gradient inside and outside the resin capsule, the application may produce a better resin regeneration and increased operational speed. However, there are still some shortcomings in this application, such as large amount of resin desorption solution, difficulty in desorption solution disposal, complicated internal structure of the reactor and high operation cost, which prevent its adoption.

In summary, although some ion exchange resin regeneration technologies have been disclosed, a comprehensive, whole-process regulation of the resin regeneration process is still lacking, resulting in many deficiencies in the resin regeneration process. It remains a difficult challenge to maintain longevity for regenerated ion exchange resin while increasing the regeneration efficiency, and simultaneously reducing the impact of desorption solution yield on advanced treatment of drinking water and municipal wastewater. It is necessary and desirable to develop a resin regeneration device with fully integration, high-efficiency, low mechanical impact, and low desorption solution yield.

SUMMARY

1. Problems

In view of problems in traditional fluidized bed resin regenerator, including the low regeneration efficiency, high level of mechanical wear and tear, and high desorption solution yield, the present invention provides an ion exchange resin fixed bed counter-current regeneration device and a method for using the same, which allows comprehensive and systematic control of the resin regeneration process, reduces resin wear and tear, improves resin regeneration efficiency, and at the same time effectively reduces the desorption solution yield and lowers disposal costs.

2. Technical Solutions

To achieve the above objectives, the technical solutions provided by the present invention are:

An ion exchange resin fixed bed counter-current regeneration device, disclosed in one embodiment of the invention, comprising: a cyclone separator, a regeneration reactor, a fully mixed resin reactor, a desorption solution storage tank, and a regenerant storage tank. The cyclone separator is placed on the top of the regeneration reactor. The upper part of the cyclonic separator is connected to the fully mixed resin reactor via a feed inlet. A resin inlet is provided at the bottom of the cyclone separator. A resin bed and a resin filter are arranged sequentially from top to bottom inside the regeneration reactor. Two ends of the resin filter are respectively connected to a fresh water outlet and the desorption solution storage tank. A resin outlet and a regenerant inlet are arranged at the bottom of the regeneration reactor. The resin outlet is connected to the fully mixed resin reactor. The regenerant inlet is connected to the desorption solution storage tank and the regenerant storage tank, respectively. The regeneration reactor is further provided with a regenerant outlet on one side, the regenerant outlet is connected to the desorption solution storage tank.

Furthermore, in at least one embodiment, a desorption solution storage tank water ejector is provided at a pipeline connecting the desorption solution storage tank and the resin filter.

Furthermore, in at least one embodiment, a fully mixed resin reactor water ejector is provided at the pipeline connecting the resin outlet to the fully mixed resin reactor.

Furthermore, in at least one embodiment, the upper part of the cyclone separator is a cylinder structure, the lower part is a cone structure, and the cone angle of the cone is 10° to 45°.

Furthermore, in at least one embodiment, the regeneration reactor is a top open cylinder with a height to diameter ratio not exceeding 3:1.

Furthermore, in at least one embodiment, the bottom of the regeneration reactor is an inverted cone, and the angle between the generatrix of the inverted cone and the horizontal plane is 10° to 15°.

Furthermore, in at least one embodiment, the resin filter is two to four hollow cylinders closed at both ends, and the resin filter is radially in parallel with the regeneration reactor, and a sieve is tightly wound on the outside of the resin filter in the circumferential direction.

Furthermore, in at least one embodiment, a filter screen is arranged on the regenerant outlet, and the filter screen is made of a stainless-steel wire mesh.

A method for using an ion exchange resin fixed bed counter-current regeneration device is disclosed. The method comprises the steps of:

Step 1, discharging a mixture of adsorption-saturated resin and water from the fully mixed resin reactor into the cyclone separator, enriching the resin and allowing the resin to enter the regeneration reactor, passing remaining water through the resin filter, and discharging the remaining water through the fresh water outlet;

Step 2, injecting, into the regeneration reactor, the regenerant from the regenerant storage tank, or the desorption solution from the desorption solution storage tank, the regenerant flows counter-currently through the resin bed to complete the resin regeneration;

Step 3, after the regeneration of the resin is completed, draining the remaining desorption solution in the regeneration reactor, injecting fresh water into the resin bed to clean the resin, and draining the fresh water through the resin filter; and Step 4, discharging the resin from the regeneration reactor into the fully mixed resin reactor to complete the regeneration process.

Furthermore, in at least one embodiment, the contact time between the resin bed and the regenerant is 10 to 30 minutes.

3. Benefits

Compared with the prior art, the technical solution provided by the present invention has the following remarkable effects:

(1) The ion exchange resin fixed bed counter-current regeneration device according to the present invention comprises a cyclone separator, a regeneration reactor, a fully mixed resin reactor, a desorption solution storage tank, and a regenerant storage tank cooperating with each other. The synergistic effect of the components has achieved the overall regulation and control of resin regeneration efficiency, service longevity, efficient utilization of desorption solution, and other aspects, and ensured the comprehensive and efficient application of resin regeneration. The device has a simple overall structure, its design is rational, and is suitable for widespread adoption.

(2) The ion exchange resin fixed bed counter-current regeneration device according to the present invention adopts a fixed bed regeneration method, wherein the resin is stationary and experiences no mechanical wear and tear, the resin transportation is realized by means of hydraulic force, thereby effectively avoiding the mechanical wear and tear present in the agitation regeneration process.

(3) The ion exchange resin fixed bed counter-current regeneration device of the present invention achieves a rapid separation between resin and water by the use of a cyclone separator, and effectively improves the regeneration efficiency of the resin.

(4) The ion exchange resin fixed bed counter-current regeneration device according to the present invention is capable of repeated use of the resin desorption solution, therefore reducing the amount of the desorption solution and the operating cost.

(5) The ion exchange resin fixed bed counter-current regeneration device of the present invention adopts a counter-current regeneration design and effectively improves the resin regeneration efficiency and outcome.

(6) The ion exchange resin fixed bed counter-current regeneration device of the present invention is easy to automate and can match and support large-scale ion exchange resin applications.

BRIEF DESCRIPTION OF THE DRAWINGS

FIG. 1 is a schematic structural diagram of an ion exchange resin fixed bed counter-current regeneration device according to one or more embodiments of the present invention.

The corresponding labels in the diagram are: 1, Cyclone separator; 2, Regeneration reactor; 3, Fully mixed resin reactor; 4, Desorption solution storage tank; 5, Regenerant storage tank; 6, Resin bed; 7, Fresh water inlet; 8, Fresh water outlet; 9, Resin filter; 10, Feed inlet; 11, Overflow port; 12, Resin inlet; 13, Regenerant outlet; 14, Regenerant inlet; 15, Desorption solution storage tank water ejector; 16, Desorption solution storage tank circulating pump; 17, Regenerant pump; 18, Fully mixed reactor ejector; 19, Fully mixed resin reactor circulating pump; 20, Resin outlet.

DETAILED DESCRIPTION OF THE PREFERRED EMBODIMENTS

For further understanding of the present invention, the present invention will be described in detail with reference to the accompanying drawings.

The present invention will be further described with reference to the following examples.

EXAMPLE 1

As shown in FIG. 1, an ion exchange resin fixed bed counter-current regeneration device in this embodiment comprises a cyclone separator (1), a regeneration reactor (2), a fully mixed resin reactor (3), a desorption solution storage tank (4) and a regenerant storage tank (5). The cyclone separator (1) is placed on the top of the regenerative reactor (2), an overflow port (11) is arranged at the top of the cyclone separator (1), the upper part of the cyclone separator (1) is connected to the lower end of the fully mixed resin reactor (3) through a feed inlet (10), the feed inlet (10) comes into contact with the cyclone separator (1) tangentially, and transports the resin and water from the fully mixed resin reactor (3) to the cyclone separator (1) by water pressure, solid-liquid separation is achieved by centrifugal force in the cyclone separator (1). The bottom of the cyclone separator (1) is provided with a resin inlet (12) through which the resin enters the regeneration reactor (2) and the remaining water is discharged from the overflow port (11).

In the present embodiment, the upper part of the cyclone separator (1) is a cylinder structure, the lower part is a cone structure, and the cone angle of the cone is 10° which facilitates the flow guidance of the internal material and facilitates the enrichment of the resin. The cyclone separator (1) is lined with rubber or other wear-resistant material. The upper part and the lower part of the regeneration reactor (2) are also respectively provided with a fresh water inlet (7) and a fresh water outlet (8). A resin bed (6) and a resin filter (9) are sequentially arranged from top to bottom in the regeneration reactor (2). The two ends of the resin filter (9) are respectively connected to the fresh water outlet (8) and the desorption solution storage tank (4). A resin outlet (20) and a regenerant inlet (14) are arranged at the bottom of the regeneration reactor (2), the resin outlet (20) is connected to the fully mixed resin reactor (3). The regenerant inlet (14) is connected to the desorption solution storage tank (4) and the regenerant storage tank (5), in which the regenerant inlet (14) is connected to the regenerant storage tank (5) through the regenerant pump (17). One side of the regeneration reactor (2) is also provided with a regenerant outlet (13), which is connected to the desorption solution storage tank (4). Specifically, as shown in the pipe connection in FIG. 1, one side of the full mixed resin reactor 3 in this embodiment is provided with a first circulation pipeline, the feed inlet 10 is connected to the first circulation pipeline, and the upper end of first circulation pipeline Is connected to the upper part of the fully mixed resin reactor (3) through the fully mixed resin reactor circulating pump (19), the lower end of the first circulating pipe is connected to the lower part of the fully mixed resin reactor (3). The first circulation pipeline is also provided with the fully mixed resin reactor water ejector 18, and the resin outlet (20) is connected to the fully mixed resin reactor water ejector (18). The resin produced in the regeneration reactor (2) is transferred to the fully mixed resin reactor (3) by the fully mixed resin reactor circulating pump (19) and the fully mixed resin reactor water ejector (18), where the circulation setting can backwash or wash counter-currently the resin sedimented on the bottom of the fully mixed resin reactor (3), which can keep the resin in a fluffy state and enhance the recycling or regeneration effect of the resin. Similarly, one side of the desorption solution storage tank (4) is provided with a second circulation pipeline, the regenerant outlet (13) and the regenerant inlet (14) are respectively connected to the second circulation pipeline, the upper end of the second circulation pipeline is connected to the upper part of the desorption solution storage tank (4), the lower end of the second circulation pipeline is connected to the lower part of the desorption solution storage tank (4) through the desorption solution storage tank circulating pump (16). The second circulation pipeline is also provided with the desorption solution storage tank water ejector (15), which is connected to one end of the resin filter (9). Through the action of the regenerant pump (17), the regenerant slowly passes from bottom to top through the resin bed 6, and is discharged from the regenerant outlet (13). Through the effect of the desorption solution storage tank circulating pump (16), the desorption solution flows out of the bottom of the desorption solution storage tank (4) and flows into the top of the desorption solution storage tank (4) to form an internal circulation. A negative pressure is generated at the desorption solution storage tank water ejector (15), the remaining regenerant in the regeneration reactor (2) is drained to the desorption solution storage tank (4) through the resin filter (9). The desorption solution in the desorption solution storage tank (4) can be reused.

In this embodiment, the top part of the regeneration reactor (2) has a top open cylinder structure. The height-to-diameter ratio of the cylinder does not exceed 3:1, in order to avoid excessive column pressure and prevent the resin from forming clumps under pressure within the regenerating reactor (2), which would have deleterious effects on regeneration. The bottom part of the regeneration reactor (2) is an inverted cone structure. The angle between the generatrix of the inverted cone and the horizontal plane is 10° to 15°, which can effectively guide the resin flow. The inner wall of the bottom of the regeneration reactor (2) is made of smooth material, further facilitating the resin flow. The resin filter (9) is made of four hollow cylinders closed at both ends. Other numbers are possible. The resin filter (9) is radially parallel to the regeneration reactor (2). The outside of the resin filter (9) is tightly wound, in the circumferential direction, with a sieve having a diameter slightly smaller than that of the regenerated resin, therefore retaining the resin and passing the water/solution. The screen on the sieve can be selected from material such as stainless-steel wire mesh. Similarly, the regenerant outlet (13) is provided with a filter screen, i.e., sieve, the pore size of the filter screen is slightly smaller than the regenerated resin, and the filter screen can also be made from a stainless-steel wire screen.

The regeneration device of the embodiment comprehensively and systematically regulates the regeneration process of the resin through the coordination and cooperation of the cyclone separator, the regeneration reactor, the fully mixed resin reactor, the desorption solution storage tank and the regenerant storage tank, thereby significantly improves the resin regeneration efficiency, the service longevity of the resin, and the re-use of desorption solution, among many aspects. The device and the method are well suited for wide-range and large-scale expansion or adoption. Each component of the embodiment relies on and collaborates with other component(s) with precise, efficient, and clear structure distribution that maximizes space saving. As a result, the regeneration process flows smoothly and effortlessly, which greatly facilitates production operation. In one embodiment, a specific method of use is disclosed as follows:

In one embodiment, a method for using the ion exchange resin fixed bed counter-current regeneration device is disclosed. The method comprises the following steps:

Step 1, using water pressure, discharging a mixture of adsorption-saturated resin and water from the fully mixed resin reactor (3) into the cyclone separator (1) along a tangential direction. Under the action of centrifugal force, the resin is enriched and enters into the regeneration reactor (2), while the remaining small amount of water passes through the resin filter (9) and is discharged from the fresh water outlet (8);

Step 2, fresh regenerant (NaCl solution with a mass concentration of 15%, for example) from the regenerant tank (5) or desorption solution from the desorption solution storage tank (4) is injected into the regeneration reactor (2) through the action of the regenerant pump (17). The regenerant flows counter-currently and slowly through the resin bed (6) to achieve resin regeneration. The contact time between the resin bed 6 and the regenerant is 10 to 30 minutes, the regenerant counter-current velocity is 4 BV/h;

Step 3, after the resin regeneration is complete, turning on the desorption solution storage tank circulating pump (16), draining the remaining desorption solution in the regeneration reactor (2) using the negative pressure generated by the desorption solution storage tank water ejector (15), injecting fresh water from the fresh water inlet (7) into the resin bed (6) to clean the resin, and draining the remaining water through the resin filter (9);

Step 4, injecting a small amount of water into the regeneration reactor (2), turn on the fully mixed resin reactor circulating pump (19), discharging the regenerated resin from the regeneration reactor (2) and transporting the regenerated resin into the fully mixed resin reactor (3) by using the negative pressure generated by the fully mixed resin reactor water ejector (18) to complete the regeneration process.

EXAMPLE 2

An ion exchange resin fixed bed counter-current regeneration device, substantially in accordance with the Example 1, is disclosed. Furthermore, the regenerative reactor (2) is a glass fiber steel structure with a diameter of 1.5 meter and a height of 2 meters. The cyclone separator (1) has an inner diameter of 250 mm, the cone angle of the lower part of the cyclone separator (1) is 20°, the diameter of the feed inlet (10) is 75 mm, the diameter of the overflow port (11) is 100 mm, and the diameter of the resin inlet (12) is 35 mm. The resin filter (9) includes two hollow cylinders with both ends closed. The sieve that tightly wraps around the periphery of the resin filter (9) has a sieve mesh aperture of 150 μm. The distance between the regenerant outlet (13) and the top of the regeneration reactor (2) is 60 cm.

After the ion exchange resin is regenerated by the device, the equilibrium adsorption amount of the regenerated resin is greater than 95% of the equilibrium adsorption amount of new resin.

EXAMPLE 3

In this embodiment, an ion exchange resin fixed bed counter-current regeneration device, substantially similar to Example 2, is disclosed. The regeneration reactor (2) in this embodiment is a glass steel structure with a diameter of 2.0 meters and a height of 2.5 meters. The inner diameter of the device is 300 mm, the cone angle of the lower cone of the cyclone (1) is 45°, the diameter of the feed inlet (10) is 50 mm, the diameter of the resin inlet (12) is 38 mm. The resin filter (9) is 3 hollow cylinders with both ends closed. The sieve that tightly wraps around the periphery of the resin filter (9) has a sieve mesh aperture of 150 μm. The distance between the regenerant outlet (13) and the top of the regeneration reactor (2) is 60 cm.

In the present embodiment, a fresh regenerant (15% by mass of NaCl+1% by mass of NaOH solution) from the regenerant tank (5) or a desorption solution from the desorption solution storage tank (4) is injected into the regenerating reactor (2) through the effect of the regenerant pump 17. The regenerant flows counter-currently and slowly through the resin bed (6) to complete the resin regeneration. The counter-current velocity of the regenerant is 4 BV/h.

After the ion exchange resin is regenerated by this device, the equilibrium adsorption amount of the regenerated resin is greater than 98% of the equilibrium adsorption amount of the new resin.

EXAMPLE 4

In this embodiment, an ion exchange resin fixed bed counter-current regeneration device, substantially similar to Example 2, is disclosed. The regenerant in this embodiment is a 26% NaCl solution instead. After the ion exchange resin is regenerated by the device, the adsorption equilibrium amount of the regenerated resin is greater than 98% of the adsorption equilibrium amount of the new resin.

EXAMPLE 5

In this embodiment, an ion exchange resin fixed bed counter-current regeneration device, substantially similar to Example 4, is disclosed. In this embodiment, the regenerant is reused. Prior to using the device, the desorption solution storage tank (4) is supplemented with NaCl powder to 5%. After the desorption solution was reused four times, the equilibrium adsorption amount of the regenerated resin was greater than 70% of the equilibrium adsorption amount of the new resin. The desorption solution yield was only ¼ of the traditional regeneration method, and a large amount of salt was saved.

The present invention and its embodiments have been described above in schematic form. The description is restrictive, and the accompanying drawings are merely one of the embodiments of the present invention. The actual structure is not limited thereto. Still other embodiments of the present invention may become readily apparent to those skilled in the art from the detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive. The drawings are one of the embodiments of the present invention. Structure, form and examples that are similar to the technical solutions and are designed by those skilled in the art without deviating the spirit of the invention and without creativity, will all fall under the scope of protection of the invention.

What is claimed is:

1. An ion exchange resin fixed bed counter-current regeneration device, comprising:
   a cyclone separator (1);
   a regeneration reactor (2);
   a fully mixed resin reactor (3);
   a desorption solution storage tank (4); and
   a regenerant storage tank (5), wherein the cyclone separator (1) is placed on the top of the regeneration reactor (2), the upper part of the cyclone separator (1) is connected to the fully mixed resin reactor (3) through a feed inlet (10), a resin inlet (12) is provided at the bottom of the cyclone separator (1), a resin bed (6) and a resin filter (9) are sequentially arranged from top to bottom inside the regeneration reactor (2), two ends of the resin filter (9) are respectively connected to a fresh water outlet (8) and the desorption solution storage tank (4), a resin outlet (20) and a regenerant inlet (14) are provided at the bottom of the regeneration reactor (2), the resin outlet (20) is connected to the fully mixed resin reactor (3), the regenerant inlet (14) is respectively connected to the desorption solution storage tank (4) and the regenerant storage tank (5), one side of the regeneration reactor (2) is also provided with a regenerant outlet (13), the regenerant outlet (13) is connected to the desorption solution tank (4).

2. An ion exchange resin fixed bed counter-current regeneration device according to claim 1, further comprising a desorption solution storage tank water ejector (15) provided on a pipeline connecting the desorption solution storage tank (4) and the resin filter (9).

3. An ion exchange resin fixed bed counter-current regeneration device according to claim 1 or claim 2, further comprising a fully mixed resin reactor water ejector (18) located on the pipeline connecting the resin outlet (20) to the fully mixed resin reactor (3).

4. An ion exchange resin fixed bed counter-current regeneration device according to claim 1 or claim 2, wherein the upper part of the cyclone separator (1) adopts a cylinder structure and the lower part of the cyclone separator (1) adopts a cone structure, and the cone angle of the cone structure being in the range of 10°~45°.

5. An ion exchange resin fixed bed counter-current regeneration device according to claim 4, wherein the cylinder is a top open cylinder, and the height-to-diameter ratio of the cylinder does not exceed 3:1.

6. An ion exchange resin fixed bed counter-current regeneration device according to claim 5, wherein the lower part of the regeneration reactor (2) is an inverted cone, and the angle between the generatrix of the inverted cone and the horizontal plane is within 10°~15°.

7. An ion exchange resin fixed bed counter-current regeneration device according to claim 6, wherein the resin filter (9) comprises two to four hollow cylinders closed at both ends, the resin filter (9) is radially in parallel with the regeneration reactor (2), and a sieve is tightly wound around the outside of the resin filter (9) in the circumferential direction.

8. An ion exchange resin fixed bed counter-current regeneration device according to claim 7, wherein a filter screen is arranged on the regenerant outlet (13), and the filter screen is made of a stainless-steel wire mesh.

9. A method for using an ion exchange resin fixed bed counter-current regeneration device, comprising the steps of:
   step 1, discharging a mixture of adsorption-saturated resin and water from a fully mixed resin reactor (3) into a cyclone separator (1), enriching the resin, causing the resin to enter a regeneration reactor (2), passing remaining water through a resin filter (9), and discharging the remaining water through a fresh water outlet (8);
   step 2, injecting, into the regeneration reactor (2), a regenerant from a regenerant storage tank (5), or a desorption solution from a desorption solution storage tank (4), the regenerant flows counter-currently through a resin bed (6) to complete the resin regeneration;
   step 3, after the resin regeneration is completed, draining the remaining desorption solution in the regeneration reactor (2), injecting fresh water into the resin bed (6) to clean the resin, and draining the fresh water through the resin filter (9); and
   Step 4, discharging the regenerated resin from the regeneration reactor (2) into the fully mixed resin reactor (3) to complete the regeneration process.

10. A method for using an ion exchange resin fixed bed counter-current regeneration device according to claim 9, wherein the contact time between the resin bed (6) and the regenerant is 10 to 30 minutes.

* * * * *